(12) United States Patent
Martin

(10) Patent No.: US 11,906,289 B2
(45) Date of Patent: Feb. 20, 2024

(54) TRIANGULATION-BASED OPTICAL PROFILOMETRY SYSTEM

(71) Applicant: INSTITUT NATIONAL D'OPTIQUE (INO), Quebec (CA)

(72) Inventor: Francois Martin, Quebec (CA)

(73) Assignee: INSTITUT NATIONAL D'OPTIQUE, Quebec (CA)

(*) Notice: Subject to any disclaimer, the term of this patent is extended or adjusted under 35 U.S.C. 154(b) by 352 days.

(21) Appl. No.: 17/612,466

(22) PCT Filed: Jun. 28, 2019

(86) PCT No.: PCT/IB2019/055532
§ 371 (c)(1),
(2) Date: Nov. 18, 2021

(87) PCT Pub. No.: WO2020/260934
PCT Pub. Date: Dec. 30, 2020

(65) Prior Publication Data
US 2022/0214162 A1    Jul. 7, 2022

(51) Int. Cl.
*G01B 11/25*   (2006.01)
*H04N 23/55*   (2023.01)
(Continued)

(52) U.S. Cl.
CPC .......... *G01B 11/2518* (2013.01); *G01B 11/24* (2013.01); *G01B 11/25* (2013.01); *H04N 23/55* (2023.01); *H04N 23/56* (2023.01)

(58) Field of Classification Search
CPC ......... G01B 11/22; G01B 11/24; G01B 11/25; G01B 11/2509; G01B 11/2513;
(Continued)

(56) References Cited

U.S. PATENT DOCUMENTS 5,003,166 A * 3/1991 Girod .................... G01S 17/89
250/201.4
5,218,427 A * 6/1993 Koch ................. G05B 19/4207
702/167

(Continued)

FOREIGN PATENT DOCUMENTS

CA    2940079 A1    9/2015

OTHER PUBLICATIONS

International Search Report of PCT/IB2019/055532, Search Completed on Feb. 19, 2020.

*Primary Examiner* — Gordon J Stock, Jr.
(74) *Attorney, Agent, or Firm* — BCF LLP

(57) ABSTRACT

A triangulation-based optical profilometry system for scanning a three-dimensional sample surface located at a sample plane includes a projection system; an image sensor; a processing unit; an objective lens assembly for imaging onto the image sensor a luminous line formed on the sample plane, a first direction orthogonal to an optical axis and being defined parallel to an extent of the luminous line, a second direction being defined perpendicular to the first direction; and a diaphragm defining a non-circular aperture defined by a first dimension and a second dimension greater than the first dimension, the diaphragm being rotationally oriented such that the first dimension is aligned with the first direction and the second dimension is aligned with the second direction, the objective lens assembly being arranged to form an out-of-focus image of the luminous line on the image sensor.

15 Claims, 7 Drawing Sheets

(51) Int. Cl.
*H04N 23/56* (2023.01)
*G01B 11/24* (2006.01)

(58) Field of Classification Search
CPC ............ G01B 11/2518; G01B 11/2522; G01B 11/2527; G01B 11/2531; G01B 11/2536; G01B 11/254; G01B 11/2545; H04N 23/55; H04N 23/56
See application file for complete search history.

(56) References Cited

U.S. PATENT DOCUMENTS

| | | | |
|---|---|---|---|
| 7,446,885 B2* | 11/2008 | Zabolitzky | G01B 11/24 356/601 |
| 7,916,309 B2* | 3/2011 | Gharib | G03B 35/02 356/601 |
| 8,244,023 B2 | 8/2012 | Yamada | |
| 9,445,010 B2* | 9/2016 | Shpunt | H04N 13/257 |
| 9,736,463 B2* | 8/2017 | Gharib | H04N 13/254 |
| 2008/0259354 A1 | 10/2008 | Gharib et al. | |

* cited by examiner

TRIANGULATION-BASED OPTICAL PROFILOMETRY SYSTEM

TECHNICAL FIELD

The present application relates to triangulation-based optical profilometry systems.

BACKGROUND

Triangulation-based three-dimensional optical profilometry systems are employed as contact-less surface measurement/mapping systems. A projection system projects a luminous line onto a sample surface. An imaging system, disposed at an angle to the sample surface, images the projected line onto an image sensor. Based on standard principles of triangulation-based profilometry, distortions in the imaged line are used to calculate the surface profile along the portion of the sample surface over which the luminous line was projected.

Generally, a centerline of the imaged luminous line is used to determine the surface profile for the sample surface. Various methods can be used for computing the centerline of the imaged luminous line, one of the most popular being the computation of the centroid (also referred to as the first moment, center of mass, or center of gravity) of the brightness (irradiance) profile along the thickness of the imaged line. The centroid is then computed for each sampling position along the imaged line to generate the centerline.

In the interest of maximizing accuracy of the profilometry measurements, the projected luminous line is preferably thin, in order to capture a smaller cross-sectional area orthogonal to the lateral extent of the line (i.e. thickness of the line) Similarly, resolution of the imaging system is often optimized in order to better capture sample surface details across a lateral extent of the sample.

However, the fine resolution of triangulation-based profilometry systems that use pixel-based image sensors can lead to non-physical artifacts appearing in the centroid calculation, and therefore in the calculated surface profile.

FIG. 1 depicts an example image 40 of a luminous line projected onto a flat, tilted surface, as captured by a two-dimensional pixel array based image sensor. As the irradiance tracks diagonally across the image 40, activation of different rows of pixels can been seen as one moves from left to right. A centroid line 46 extracted from the image of FIG. 1 is illustrated in graph 45 of FIG. 2. A straight line 48, representing the theoretical centroid profile associated to a luminous line that would hit a flat, tilted surface is also illustrated, for comparison.

As can be seen from the centroid line 46, several jumps or "wiggles" in the calculated vertical positions of the centroid are present. These non-physical artifacts appear in the centroid calculation where the tilted irradiance line is only detected in one pixel row for several adjacent lateral points on the line, due to the thickness of the imaged line that is smaller than the vertical dimension of a pixel of the image sensor. Rather than diagonally crossing different pixels, some portions of the tilted image line remain within a single row of pixels. For instance, in three neighboring pixels, the imaged line could be incident on a top portion of the first pixel, a center portion of the second pixel, and a bottom portion of the third pixel. In the centroid calculation, however, the image could appear as a horizontal line as pixels do not generally report where on a given pixel the light is detected.

Some solutions have been proposed to address this issue. The discretization problem above can at least nominally be tackled by extending the imaged line over many pixels. One possible solution is thus simply to use an image sensor with higher resolution (smaller pixels), but the increased cost of high-resolution sensors can quickly become a limiting factor in such a solution. Depending on the particular system, it is also possible that no greater resolution image sensor is available or practical.

It has also been proposed to form a thicker luminous line on the sample surface under inspection. The corresponding image line formed on the image sensor will generally be thicker, and thus will cover a larger number of pixels along the vertical direction, aiding in diminishing this discretization problem. The thicker luminous line formed on the sample surface also results in decreased resolution along the direction orthogonal to the line, however the sampling area would increase as wider strips of the sample surface are gathered into the same line measurement.

In order to cover multiple pixels, defocusing the image of the projected line has also been proposed. In such a case, any point of the luminous line formed on the sample surface would be imaged over a plurality of pixels of the image sensor. This proposed solution would aid in maintaining a small sampling area by keeping a fine line projected on the sample surface. The lateral resolution would however be decreased, as each point along the line would be spread laterally across the image sensor as well, overlapping with adjacent lateral points along the line.

There therefore remains a desire for solutions related to addressing measurement artifacts in triangulation-based three-dimensional optical profilometry systems.

SUMMARY

It is an object of the present technology to ameliorate at least some of the inconveniences present in the prior art. Developers of the present technology have developed various embodiments thereof based on their appreciation of at least one technical problem associated with the prior art approaches to triangulation-based three-dimensional optical profilometry and, particularly, to measurement artifacts related to imaging resolution for surface measurement.

In order to aid in minimizing the non-physical artifacts (jumps or "wiggles") in the calculated surface profile related to discretization issues in pixel-based image sensors, an optical profilometry system is presented herein with the following features in accordance with a first broad aspect of the present technology. An objective lens assembly is arranged to form an out-of-focus image of a sample plane on an image sensor. The system further includes a diaphragm with a non-circular aperture, disposed along an optical axis between the sample plane and the image sensor. The defocused image of a luminous line projected on the sample plane is then asymmetrically spread over the image sensor. The image of any given point along the luminous line is thus received at the image sensor as a defocused spot, elongated along a vertical direction to extend over a greater number of pixels of the image sensor in the vertical direction than in the lateral direction. The vertical centroid of the imaged line can then be calculated over multiple rows of pixels, diminishing the effect of the discrete pixel arrangement. As the defocus is less extensive along the lateral direction, aiding in maintaining the lateral resolution of the measurement.

In accordance with one broad aspect of the present technology, there is provided triangulation-based optical profilometry system for scanning a three-dimensional sample surface located at a sample plane of the system. The system includes a projection system for projecting a luminous line across the sample surface; an image sensor for converting images of the luminous line, as projected on the sample plane, into electrical signals; a processing unit communicatively connected to the image sensor for processing the electrical signals; an objective lens assembly for imaging the luminous line, as projected on the sample plane, onto the image sensor, the objective lens assembly defining an optical axis extending between the sample plane and the image sensor, a first direction orthogonal to the optical axis and being defined parallel to an extent of the luminous line as projected, a second direction being defined perpendicular to the first direction, the first and second directions defining a plane orthogonal to the optical axis; and a diaphragm disposed along the optical axis between the sample plane and the image sensor, the diaphragm defining a non-circular aperture therein, the aperture being defined by a first dimension and a second dimension perpendicular to the first dimension, the second dimension being greater than the first dimension, the diaphragm being rotationally oriented relative to the image sensor such that the first dimension is aligned with the first direction and the second dimension is aligned with the second direction, the objective lens assembly being arranged to form an out-of-focus image of the sample plane on the image sensor.

In some embodiments, the diaphragm, the objective lens assembly and the image sensor are arranged such that an image of a given point along the luminous line, as projected onto the sample surface and collected by the image sensor during operation of the system, exhibits greater defocus along the second direction than the first direction.

In some embodiments, the luminous line extends laterally across the sample plane; the first direction is a lateral direction; the second direction is a vertical direction; and the diaphragm, the objective lens assembly, and the image sensor are arranged such that an image of a given point along the luminous line, as projected onto the sample surface and collected by the image sensor during operation of the system, exhibits greater vertical defocus than lateral defocus.

In some embodiments, the image sensor is a two-dimensional array of pixels; and during operation of the system, the image of the given point of the luminous line extends over a greater number of pixels of the image sensor in the vertical direction than in the lateral direction.

In some embodiments, during operation of the system, the image of the given point of the luminous line on the image sensor extends vertically over at least two pixels of the image sensor.

In some embodiments, a normal defined by the sample plane is skewed by a first angle ($\gamma$) relative to the optical axis; and a normal defined by the image sensor is skewed by a second angle ($\gamma'$) relative to the optical axis.

In some embodiments, the first angle ($\gamma$) and the second angle ($\gamma'$) are arranged in a Scheimpflug configuration, such that the second angle ($\gamma'$) is chosen relative to the first angle ($\gamma$) according to the relation:

$$\gamma' = \tan^{-1}\left[\frac{S_i}{S_o}\tan(\gamma)\right],$$

where $S_i$ is an image distance measured from the objective lens assembly to the image sensor and $S_o$ is an object distance measured from the sample plane to the objective lens assembly.

In some embodiments, the projection system includes at least one illumination source; and a projection optical assembly for projecting light from the illumination source onto the sample plane in the form of a line.

In some embodiments, the at least one illumination source is a laser source; and the luminous line is a laser line projected onto the sample plane.

In some embodiments, the image sensor is disposed at a defocus position shifted along the optical axis away from an image plane of the sample plane as imaged by the objective lens assembly.

In some embodiments, the objective lens assembly includes a plurality of lenses.

In some embodiments, the diaphragm is disposed at an aperture stop of the objective lens assembly.

In some embodiments, the diaphragm is disposed at an entrance pupil of the objective lens assembly.

In some embodiments, the diaphragm is disposed at an exit pupil of the objective lens assembly.

In some embodiments, the second dimension of the aperture is about four times greater than the first dimension.

In some embodiments, the aperture is generally rectangular in form.

In some embodiments, a shape of the aperture is one of a geometric stadium, an oval, a rhombus, and a rounded-corner rectangle.

In some embodiments, the image sensor is one of: a charge-coupled device (CCD), a complementary metal-oxide-semiconductor (CMOS) device, and a N-type metal-oxide-semiconductor (NMOS) device.

Quantities or values recited herein are meant to refer to the actual given value. The term "about" is used herein to refer to the approximation to such given value that would reasonably be inferred based on the ordinary skill in the art, including equivalents and approximations due to the experimental and/or measurement conditions for such given value.

For purposes of this application, terms related to spatial orientation such as vertical and lateral are as they would normally be understood with reference to an optical axis to which the vertical and lateral directions are orthogonal. Terms related to spatial orientation when describing or referring to components or sub-assemblies of the system, separately from the system, should be understood as they would be understood when these components or sub-assemblies are assembled in the system, unless specified otherwise in this application.

In the context of the present specification, unless expressly provided otherwise, a "computer" and a "processing unit" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
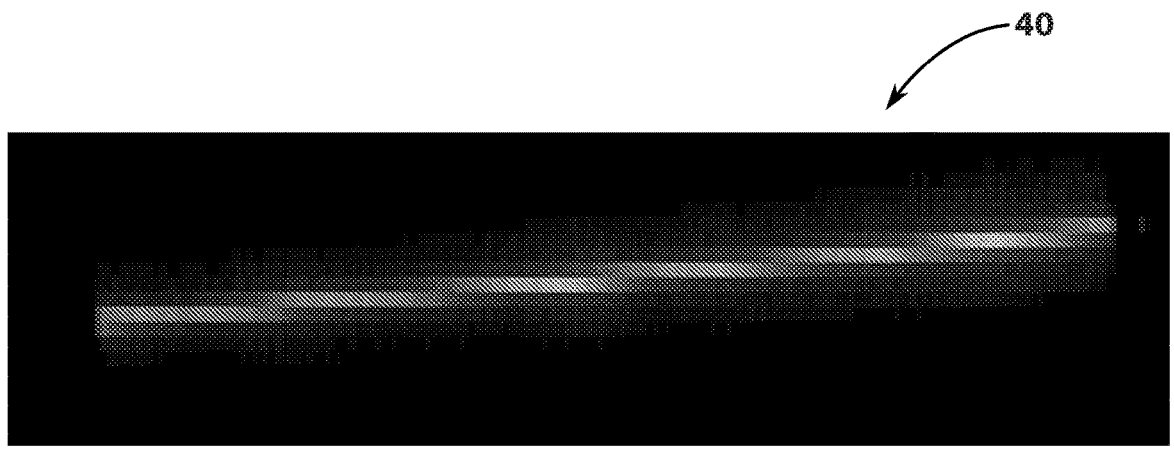
FIG. 1 depicts an example image of a projected line as captured by a triangulation based three-dimensional optical profilometry system according to the prior art.

The drawings are not necessarily to scale and may be illustrated by phantom lines, diagrammatic representations and fragmentary views. In certain instances, details that are not necessary for an understanding of the embodiments or that render other details difficult to perceive may have been omitted. It should further be noted that throughout the appended drawings, like features are identified by like reference numerals.

DETAILED DESCRIPTION

Reference will now be made in detail to various non-limiting embodiments for an optical system and components disposed therein. It should be understood that other non-limiting embodiments, modifications and equivalents will be evident to one of ordinary skill in the art in view of the non-limiting embodiments disclosed herein and that these variants should be considered to be within the scope of the appended claims. Furthermore, it will be recognized by one of ordinary skill in the art that certain structural and operational details of the non-limiting embodiments discussed hereafter may be modified or omitted altogether (i.e. non-essential). In other instances, well known methods, procedures, and components have not been described in detail.

Figure 3:
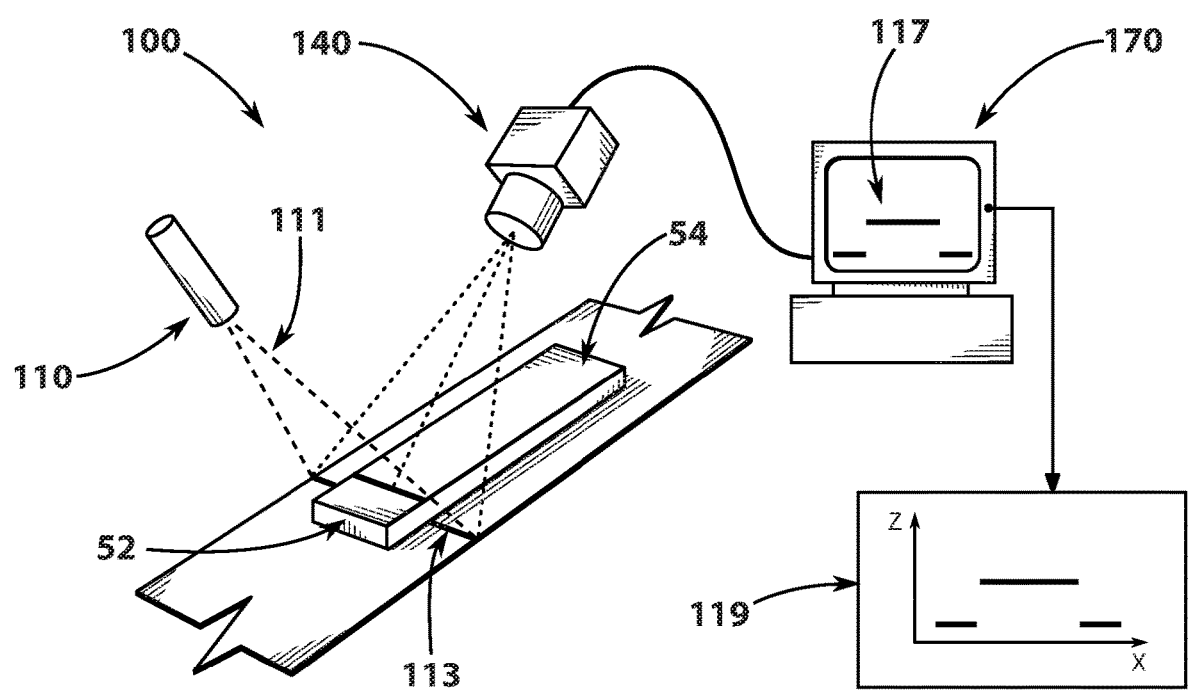
FIG. 3 schematically depicts a triangulation-based three-dimensional optical profilometry system according to the present technology.
Figure 4:
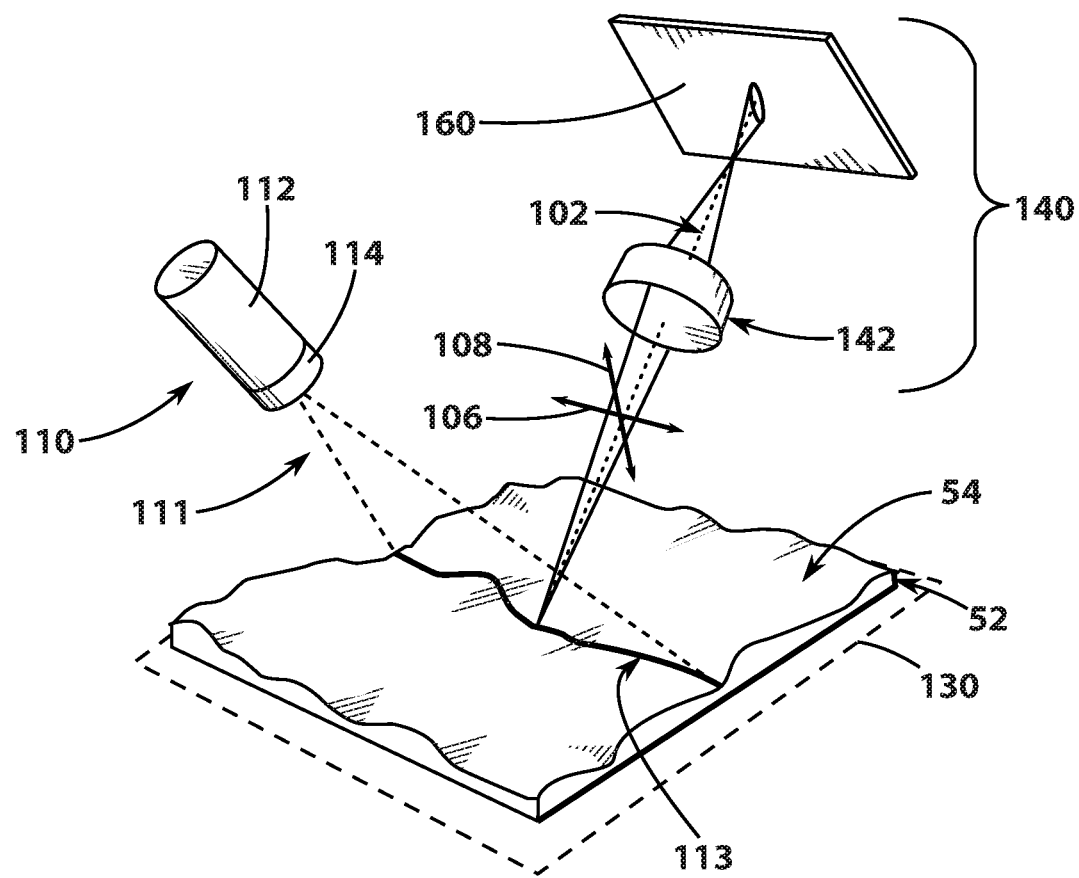
FIG. 4 is a close-up view of some portions of the profilometry system of FIG. 3.

A triangulation-based three-dimensional optical profilometry system 100 according to the present technology, also referred to herein as the system 100, is schematically illustrated in FIGS. 3 and 4. The system 100 includes a projection system 110 for projecting light onto a sample, a sample plane 130 for receiving the sample, and an imaging assembly 140 for imaging part of the light reflected from the illuminated portion of the sample surface 54. Each of the projection system 110, the sample plane 130, and the imaging assembly 140 will be described in more detail below. Depending on the specific embodiment or application, the system 100 could include additional components that need not be described herein, including but not limited to: support structures, mechanical stages, power supplies, control hardware and/or software, electronic systems, etc.

The general principle of operation of the triangulation-based three-dimensional optical profilometry system 100 is illustrated in FIG. 3. The projection system 110 produces a fan-shaped light beam 111 which generates a luminous line 113 spanning across the sample plane 130 along a lateral direction 106, spanning a lateral extent of a sample 52 disposed on the sample plane 130. As used herein, it should be noted that the "lateral" direction 106 simply indicates a direction orthogonal to a line connecting the projection system 110 and the imaging assembly 140 and generally parallel to the sample plane 130. There is not meant to be suggested by the term lateral any specific orientation in space of either the system 100 or any sample measured therein.

The luminous line 113, as projected across a sample surface 54 of the sample 52, is then imaged by the imaging assembly 140, which includes an objective lens assembly 142 and an image sensor 160. As is illustrated, for samples 52 which have a smaller lateral extent than the luminous line 113, portions of the sample plane 130 may also be imaged. It is also contemplated that the projection system 110 could be adjusted to project only onto the sample 52.

As imaged by the imaging assembly 140, the line 113 does not generally appear as a straight line. Instead, topological features of the sample 52 distort the luminous line 113, as seen from the vantage point of the imaging assembly 140. Topological features of the sample 52 which can distort the luminous line 113 include, but are not limited to: surface shape, curvature, surface steps, surface roughness, irregularities, and holes or gaps in the surface. For example, the close-up partial image of a portion of the sample surface 54 shows surface roughness which causes the luminous line 113 to appear to undulate.

The imaging assembly 140 then captures one or more images of the luminous line 113 formed on the sample 52 at a plurality of locations along a length of the sample 52 (the length being measured along a direction perpendicular to the lateral extent of the line 113). In accordance with the principles of optical trigonometric triangulation, the objective lens assembly 142 and the image sensor 160 are located and oriented such that local variations in height located on the portion of the sample surface 54 illuminated by the luminous line 113 are detected by corresponding vertical shifts in images of the luminous line 113. A sample image 117 is illustrated as having been determined by a processing unit 170 (specifically a computer 170).

The image 117 is then processed by the computer 170 in order to correlate the line of the image 117 to the physical lateral extent and height of the sample surface 54. For each individual position along the length of the sample 52, a two-dimensional graph, illustrated by sample graph 119, is then created. The horizontal x-axis of the graph 119 corresponds to the lateral position across the sample and the vertical z-axis is the determined height, based on the distortion of the projected straight luminous line 113 by the profile of the sample surface 54. The deviations in the image 117 are correlated to an actual height variation of the sample surface 54, as illustrated on the z-axis of the graph 119, depending on parameters such as the angles of the projection system 110 and the imaging assembly 140 relative to the sample plane 130 and the magnification of the objective lens assembly 142. As is mentioned above, a centroid of the imaged line along the vertical direction is calculated for each lateral position (along the x-axis) to determine the sample surface profile currently illuminated the projection system 110. Finally, the process of imaging the luminous line 113 at a particular position along the length of the sample surface 54 is repeated as the luminous line 113 is swept along the length of the sample surface 54. A three-dimensional map of the profile of the sample surface 54 can then be created by combining the graphs 119 collected across the length of the sample surface 54.

Figure 2:
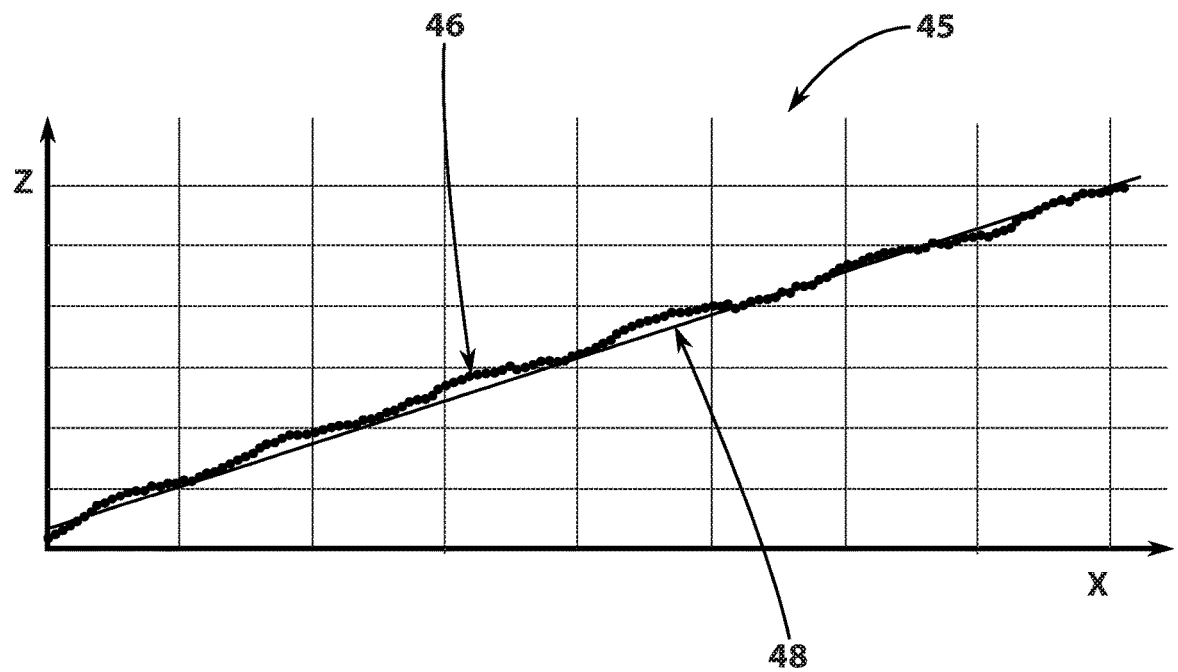
FIG. 2 illustrates a surface profile determined from the imaged line of FIG. 1.

In order to aid in minimizing the non-physical artifacts (jumps or "wiggles") visible in the calculated surface profile illustrated in the example of FIG. 2 and discussed above, the objective lens assembly 142 is arranged to form an out-of-focus image of the sample plane 130 on the image sensor 160. The system 100 further includes a diaphragm 150 with a non-circular aperture 154 (see FIG. 7, described in more detail below). The diaphragm 150 is disposed along an optical axis 102 (defined by the objective lens assembly 142) between the sample plane 130 and the image sensor 160 such that the defocused image of the luminous line 113 is asymmetrically spread over the image sensor 160. As is illustrated schematically in FIG. 4, the image of any given point along the luminous line 113 is received at the image sensor 160 as a defocused spot, elongated along a vertical direction 108 (perpendicular to the lateral direction 106 of the luminous line 113).

Figure 5A:
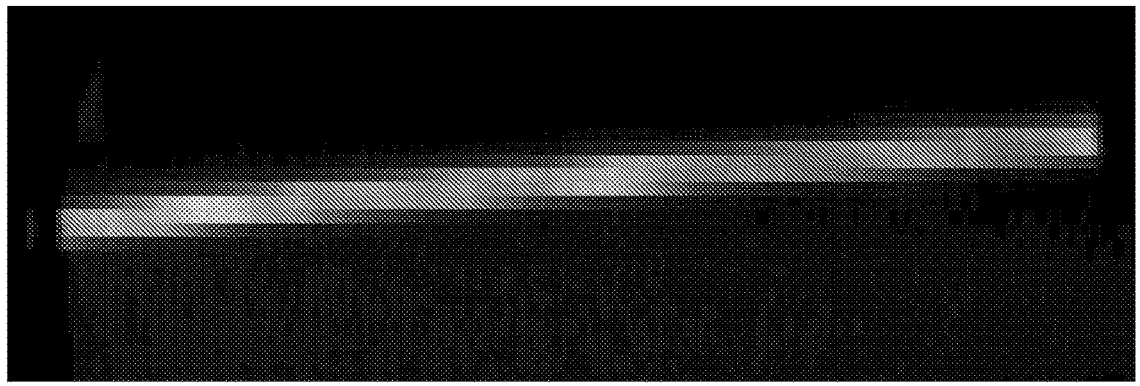
FIG. 5A is an example line as imaged by the profilometry system of FIG. 3.
Figure 5B:
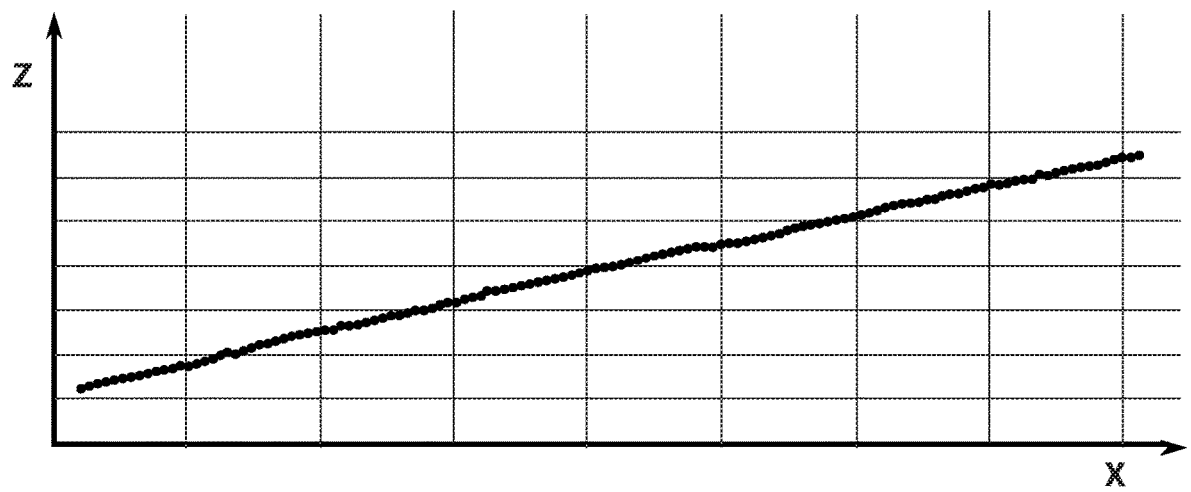
FIG. 5B illustrates a surface profile determined from the imaged line of FIG. 5A.

During operation of the system 100, the image of each point of the luminous line 113 thus extends over a greater number of pixels of the image sensor 160 in the vertical direction 108 than in the lateral direction 106. An example image of a luminous line projected on a tilted, flat surface is illustrated in FIG. 5A, where it can be seen that the line is defocused along the vertical direction 108 and activates at least two pixels along the entire lateral extent of the line. This allows the vertical centroid of the imaged line 113 to be calculated over multiple rows of pixels, diminishing the effect of the discrete pixel arrangement as is illustrated in FIG. 5B. As the defocus is less extensive along the lateral direction 106, the lateral resolution is less affected than it would be in cases where a circularly uniform defocus is present. While in the present embodiment the image of each given point of the luminous line 113 extends over at least two pixels of the image sensor 160 in the vertical direction 108, it is contemplated that the thickness of the imaged line 113 could extend over more pixels of the image sensor 160.

While the particulars of any given embodiment could differ, components employed in the present embodiment of the system 100 will now be described in more detail, with continuing reference to FIGS. 3 and 4.

The projection system 110 includes an illumination source 112 and a projection optical assembly 114 for projecting light from the illumination source 112 onto the sample plane 130 in the form of a line. In the present embodiment, the illumination source 112 is a laser source 112 and the line projected onto the sample plane 130 is a laser line. It is contemplated that other light sources, including partially-coherent and incoherent light sources, could be used in some embodiments. In some embodiments, it is also contemplated that the illumination source 112 could include multiple light sources. For instance, in some embodiments the illumination source 112 could include a plurality of laser sources emitting at different wavelengths. The projection optical assembly 114 includes a plurality of lenses and a linear slit (not separately illustrated), although different assemblies of optical components are contemplated.

The projection system 110 projects the luminous line 113 onto the sample 52 disposed on the sample plane 130. The sample plane 130 is the plane where the sample surface 54 should be located for proper operation of the system 100. In some embodiments, the sample plane 130 could be defined by a sample stage or table for receiving the sample 52. In some embodiments, the projection system 110 and/or the imaging assembly 140 could be positioned or adjusted such that the sample plane 130 generally aligns with the sample surface 54. Depending on the particular light source and arrangement, it is contemplated that the luminous line 113 could be well defined at a plurality of different planes. In some cases, the luminous line 113 will get its minimum thickness at one particular distance from the projection system 110, preferably at the distance of the sample plane 130.

The luminous line 113 is then imaged from the sample 52 by the imaging assembly 140. The imaging assembly 140 includes the image sensor 160, an objective lens assembly 142 and a diaphragm 150 disposed therein. The objective lens assembly 142 and the diaphragm 150 will be described in more detail below.

The image sensor 160 converts images of the luminous line 113, as projected on the sample plane 130 and imaged onto the image sensor 160 by the objective lens assembly 142, into electrical signals. According to the present technology, the image sensor 160 is a two-dimensional array of pixels, specifically a charge-coupled device (CCD). Depending on the particular embodiment, it is contemplated that the image sensor 160 could be embodied by sensors including, but not limited to, complementary metal-oxide-semiconductor (CMOS) devices and a N-type metal-oxide-semiconductor (NMOS) device.

The system 100 includes a processing unit 170 communicatively connected to the image sensor 160 for processing the electrical signals generated by the image sensor 160. The processing unit 170 is generally described as the computer 170 herein, but this is simply one example of a non-limiting embodiment. Depending on the particular embodiment of the system 100, it is contemplated that the processing unit 170 could be implemented as various structures, including but not limited to: one or more processors in a computing apparatus, software supported by a computing apparatus, and processing boards (GPU, FPGA, etc.). As is mentioned above, the computer 170 receives the electrical signals representing the image of the projected luminous line 113 from the image sensor 160. Based on those electrical signals, the computer 170 then calculates the centroid profile of the imaged line 113 to determine a physical profile of the sample surface 54.

With further reference to FIGS. 6 to 11, the objective lens assembly 142 and the diaphragm 150 will now be described in more detail. As is mentioned briefly above, the optical axis 102 is defined by the optical axis of the objective lens assembly 142. As is noted above, the lateral direction 106 is the direction orthogonal to a line connecting the projection system 110 and the imaging assembly 140 and generally parallel to the sample plane 130. Generally, the lateral direction 106 is thus also parallel to the extent of the luminous line 113 as projected and orthogonal to the optical axis 102. The vertical direction 108 is defined perpendicular to the lateral direction 106. The vertical and lateral directions 106, 108 thus generally define a plane orthogonal to the optical axis 102, as is illustrated in FIG. 4.

Figure 6:
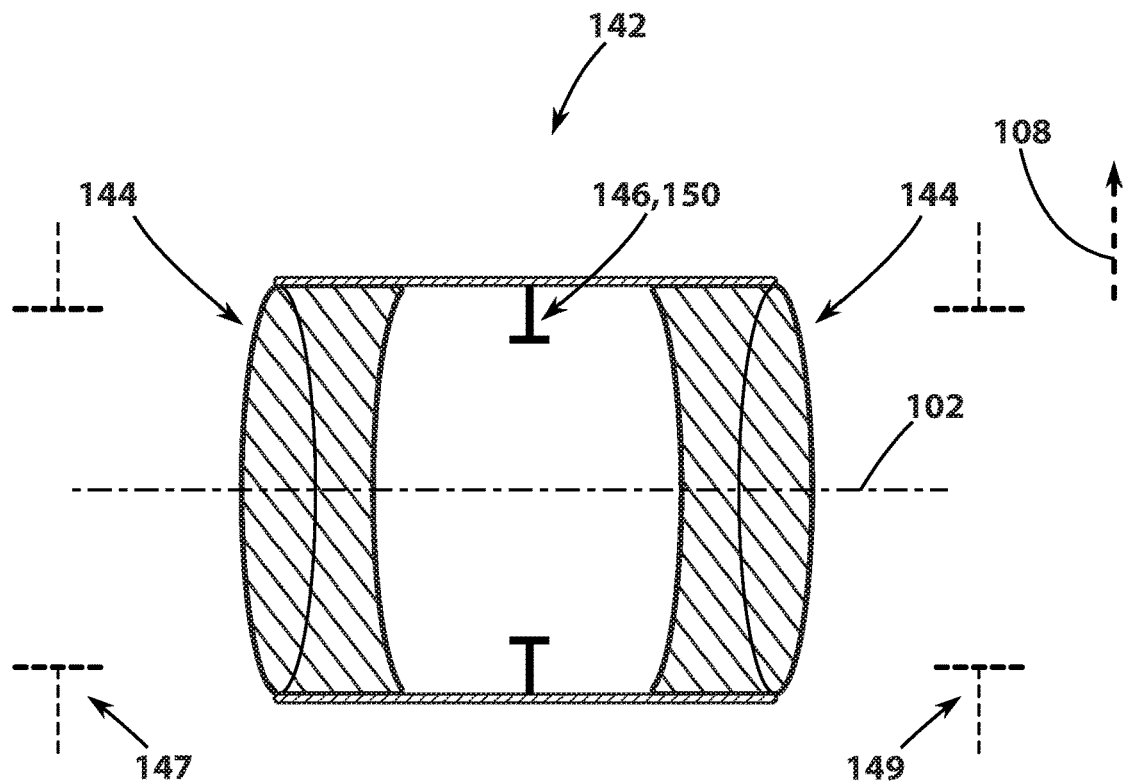
FIG. 6 schematically depicts a side view of an objective lens assembly and diaphragm of the profilometry system of FIG. 3, the Figure further showing three particular positions of the diaphragm along an optical axis.

The objective lens assembly 142 includes a plurality of lenses 144 in the illustrated example of FIG. 6, specifically a pair of doublets 144. It should be noted that this is simply one non-limiting embodiment according to the present technology. It is contemplated that the objective lens assembly 142 could include more lenses 144 than illustrated, or only a single lens 144 depending on particulars of the embodiment.

The diaphragm 150 is disposed along the optical axis 102 between the sample plane 130 and the image sensor 160. In the illustrated embodiment, the diaphragm 150 has been inserted between the lenses 144 so that the diaphragm 150 is located at an aperture stop 146 of the objective lens assembly 142. It is contemplated, however, that the diaphragm 150 could be disposed exterior to the objective lens assembly 142, either on an object side or an image side of the objective lens assembly 142. In some embodiments for example, the diaphragm 150 could be disposed at an entrance pupil 147 of the objective lens assembly 142. In some other embodiments, the diaphragm 150 could be disposed at an exit pupil 149 of the objective lens assembly 142. The particular choice of placement of the diaphragm 150 along the optical axis 102 could depend on a variety of factors including, but not limited to, physical constraints in the objective lens assembly 142 or the imaging assembly 140 and magnification of the objective lens assembly 142.

It is further contemplated that in some embodiments, the objective lens assembly 142 could be an off-the-shelf lens assembly adapted for receiving a commercially-available diaphragm defining a circular aperture. The diaphragm 150 according to the present technology could then be inserted into the off-the-shelf lens assembly, in place of the round aperture diaphragm.

Figure 7:
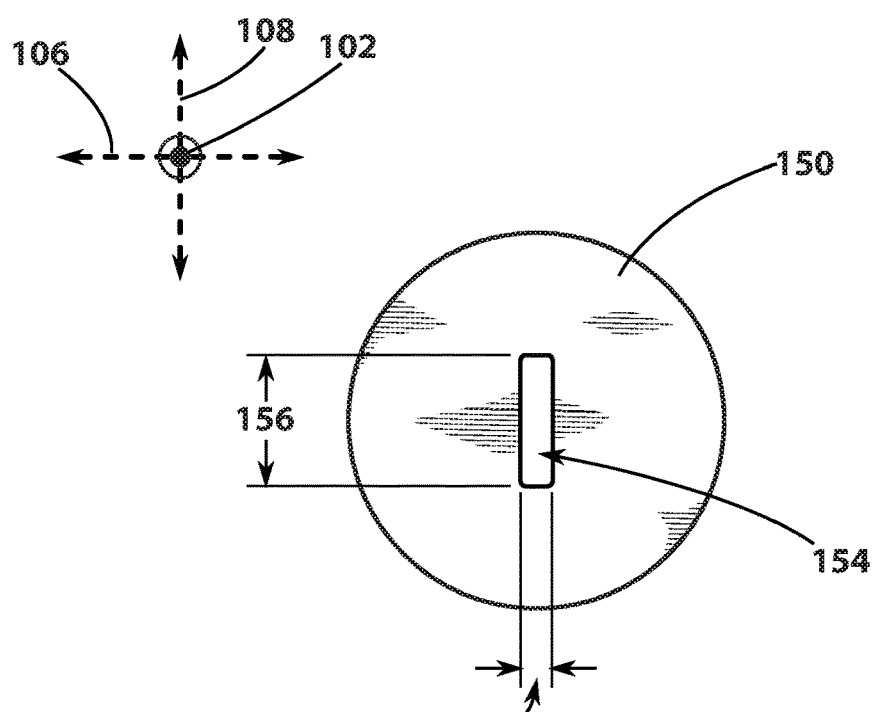
FIG. 7 illustrates the diaphragm of FIG. 6, as viewed along the optical axis of the objective lens assembly of FIG. 6.
Figure 8:
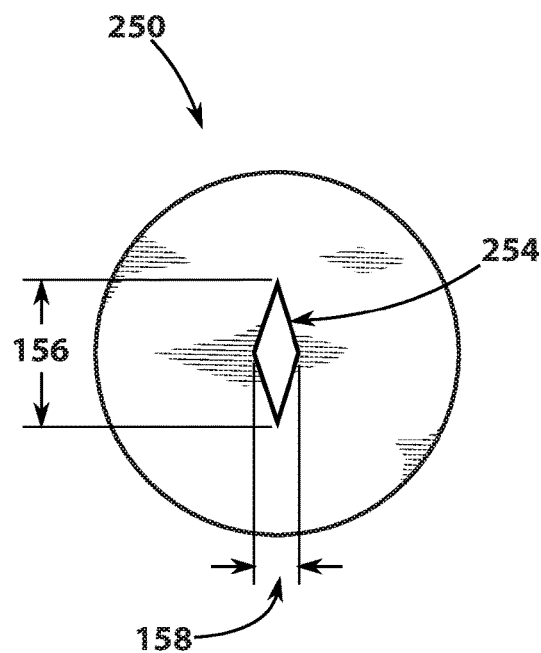
FIGS. 8 to 11 illustrate different alternative embodiments of the diaphragm of FIG. 7.
Figure 9:
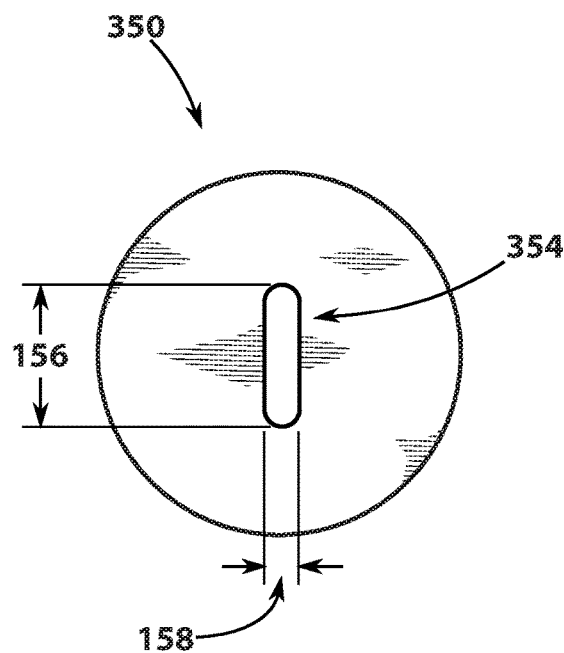
Figure 10:
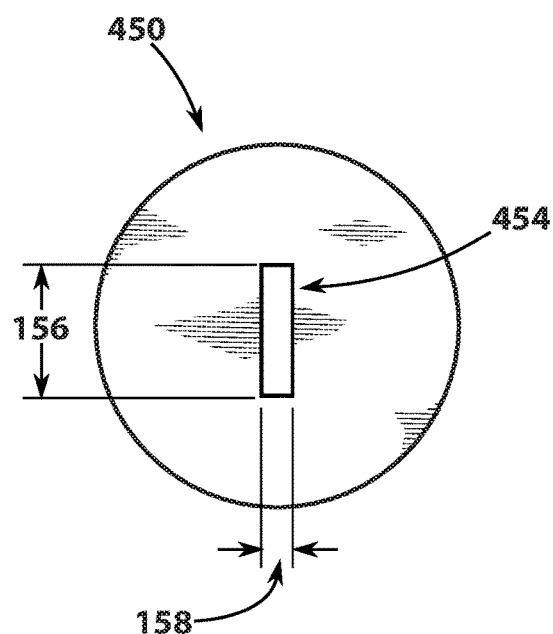
Figure 11:
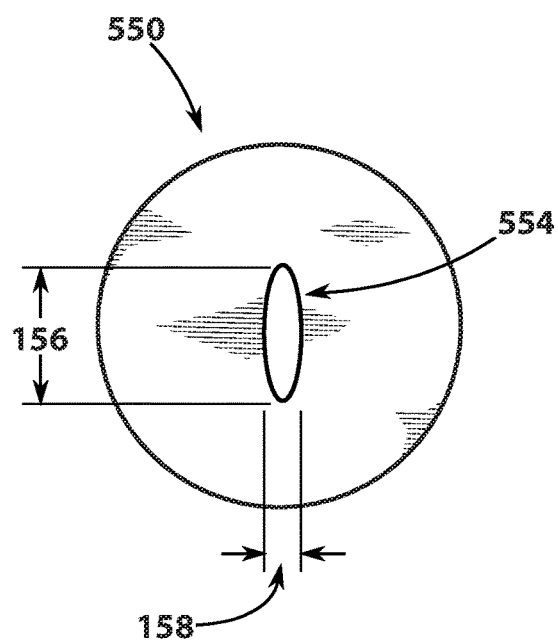

As is mentioned above, the diaphragm 150 defines therein a non-circular aperture 154. In the present embodiment, the aperture 154 is in the shape of a rounded-corner rectangle, as shown in FIG. 7. Different aperture shapes could be implemented in the present technology, as will be described in further detail below.

With reference to FIG. 7, the aperture 154 is defined in size by two dimensions: a "vertical" dimension 156 and a "lateral" dimension 158 perpendicular to the vertical dimension 156. The terms vertical and lateral dimension 156, 158 are used due to their alignment in the system 100 with the vertical and lateral directions 108, 106 when the diaphragm 150 is in use in the system 100. It should be noted however that the diaphragm 150 could be differently oriented when considered separately from the system 100 without changing the relative sizing of the "vertical" and the "lateral" dimensions 156, 158.

By the present technology, the vertical dimension 156 is greater than the lateral dimension 158, such that a larger portion of the light incident on the diaphragm 150 is allowed to pass the aperture stop 146 in the vertical direction 108 than in the lateral direction 106. In the present embodiment, the vertical dimension 156 is about four times greater than the lateral dimension 158, but the ratio of the vertical dimension 156 to the lateral dimension 158 could be greater or smaller depending on the specific embodiment.

When assembled in the system, the diaphragm 150 is rotationally oriented such that the vertical dimension 156 is aligned with the vertical direction 108 and the lateral dimension 158 is aligned with the lateral direction 106. As the objective lens assembly 142 is arranged to form an out-of-focus image of the sample plane 130 on the image sensor 160, the non-circular aperture 154 produces a non-circular spot on the image sensor 160 for any given point on the luminous line 113. Specifically, the spot on the image sensor 160 is generally oval and elongated along the vertical direction 108, although the exact spot size and dimensions will vary with the specific embodiment of the diaphragm 150 and the objective lens assembly 142.

As is noted above, this combination of the non-circular aperture 154 and the objective lens assembly 142 being arranged at a defocus position relative to the image sensor 160 allows the imaged line 113 to extend vertically over at least two rows of pixels to aid in diminishing the effect of pixel-based artifacts in centroid calculation of surface profiles.

In some embodiments, in place of the diaphragm 150 in the form of a rounded-corner rectangle, the system 100 could instead include differently shaped apertures. For instance, the system 100 could include a diaphragm 250 defining a rhombus-shaped aperture 254 (illustrated in FIG. 8). In other embodiments, the system 100 could include a diaphragm 350 defining a geometric stadium-shaped aperture 354, a diaphragm 450 defining a generally rectangular-shaped aperture 454, or a diaphragm 550 defining an oval-shaped aperture 554 (illustrated in FIGS. 9 to 11 respectively). In each of the apertures 254, 354, 454, 554, the vertical dimension of the aperture is about 4 times the lateral dimension of the aperture.

Figure 12:
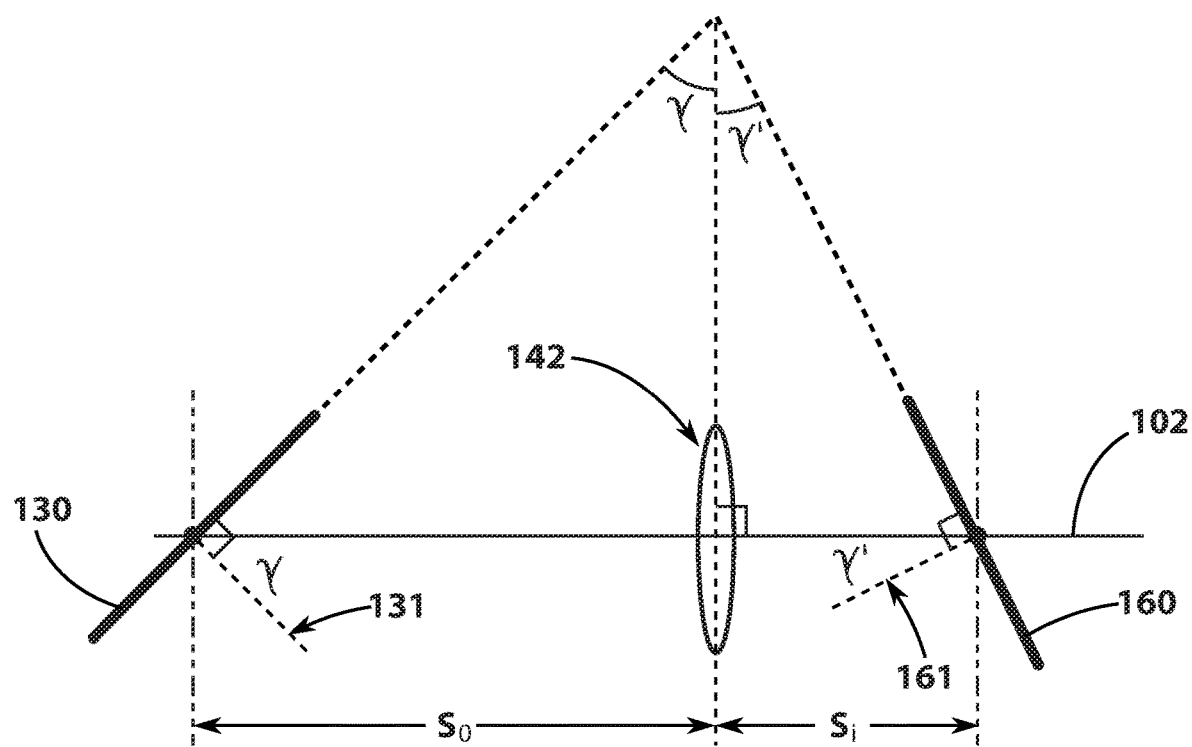
FIG. 12 schematically depicts the relative arrangement of some components of the profilometry system of FIG. 3.

As the image sensor 160 and the objective lens assembly 142 are arranged to create an out-of-focus image of the sample plane 130, the sample plane 130 and the image sensor 160 are further arranged relative to one another in order to maintain a consistent defocus across the image plane on the image sensor 160, in order to avoid varying spot size at different locations of the image sensor 160. In the present embodiment, the sample plane 130 and the image sensor 160 are each skewed to the optical axis 102 of the system 100 according to a Scheimpflug configuration. In FIG. 12, the Scheimpflug configuration of the sample plane 130 and the image sensor 160 relative to the optical axis 102 is illustrated.

For simplicity of illustration, the objective lens assembly 142 is schematically depicted as a single thin lens. As will be generally understood in the art, distances such as image distance and object distance are calculated with respect to principal planes of the objective lens assembly 142.

According to the Scheimpflug configuration, a normal 131 to the sample plane 130 is skewed by a first angle ($\gamma$) relative to the optical axis 102, where a center of the sample plane 130 is disposed at an object distance $S_o$ from the objective lens assembly 142. A normal 161 to the plane of the image sensor 160 is then skewed by a second angle ($\gamma'$) relative to the optical axis 102, where a center of the image sensor 160 is at an image distance $S_i$ from the objective lens assembly 142.

The angles ($\gamma$), ($\gamma'$) between the normals 131, 161 and the optical axis 102 are then arranged according to the relation:

$$\gamma' = \tan^{-1}\left[\frac{S_i}{S_o}\tan(\gamma)\right].$$

While the angles ($\gamma$), ($\gamma'$) are chosen based on known distances $S_i$, $S_o$ in the example above, it is contemplated that the angles ($\gamma$), ($\gamma'$) could be constrained (for instance depending on mechanical restrictions on the system 100), and the distances $S_i$, $S_o$ could instead be adapted based on the constrained angles ($\gamma$), ($\gamma'$). It is also contemplated that different configurations other than the Scheimpflug configuration could be utilized to arrange the components of the system 100.

It is noted that the foregoing has outlined some of the more pertinent non-limiting embodiments. It will be clear to those skilled in the art that modifications to the disclosed non-limiting embodiments can be effected without departing from the spirit and scope thereof. As such, the described non-limiting embodiments ought to be considered to be merely illustrative of some of the more prominent features and applications. Other beneficial results can be realized by applying the non-limiting implementations in a different manner or modifying them in ways known to those familiar with the art.

The mixing and/or matching of features, elements and/or functions between various non-limiting embodiments are expressly contemplated herein as one of ordinary skill in the art would appreciate from this disclosure that features, elements and/or functions of one embodiment may be incorporated into another implementation as appropriate, unless expressly described otherwise, above. Although the description is made for particular arrangements and methods, the intent and concept thereof may be suitable and applicable to other arrangements and applications.

What is claimed is:

1. A triangulation-based optical profilometry system for scanning a three-dimensional sample surface located at a sample plane of the system, the system comprising:
- a projection system for projecting a luminous line across the sample surface, the luminous line extending laterally across the sample plane;
- an image sensor for converting images of the luminous line, as projected on the sample plane, into electrical signals, the image sensor being a two-dimensional array of pixels;
- a processing unit communicatively connected to the image sensor for processing the electrical signals;
- an objective lens assembly for imaging the luminous line, as projected on the sample plane, onto the image sensor, the objective lens assembly defining an optical axis extending between the sample plane and the image sensor,
- a lateral direction orthogonal to the optical axis and being defined parallel to an extent of the luminous line as projected, a vertical direction being defined perpendicular to the lateral direction, the lateral and vertical directions defining a plane orthogonal to the optical axis; and
- a diaphragm disposed along the optical axis between the sample plane and the image sensor, the diaphragm defining a non-circular aperture therein, the aperture being defined by a first dimension and a second dimension perpendicular to the first dimension, the second dimension being greater than the first dimension,
- the diaphragm being rotationally oriented relative to the image sensor such that the first dimension is aligned with the lateral direction and the second dimension is aligned with the vertical direction,
- the objective lens assembly being arranged to form an out-of-focus image of the sample plane on the image sensor,
- the diaphragm, the objective lens assembly, and the image sensor being arranged such that an image of a given point along the luminous line, as projected onto the sample surface and collected by the image sensor during operation of the system, exhibits greater vertical defocus than lateral defocus,
- during operation of the system, the image of the given point of the luminous line extending over a greater number of pixels of the image sensor in the vertical direction than in the lateral direction.

2. The system of claim 1, wherein, during operation of the system, the image of the given point of the luminous line on the image sensor extends vertically over at least two pixels of the image sensor.

3. The system of claim 1, wherein the image sensor is disposed at a defocus position shifted along the optical axis away from an image plane of the sample plane as imaged by the objective lens assembly.

4. The system of claim 1, wherein the objective lens assembly includes a plurality of lenses.

5. The system of claim 1, wherein the diaphragm is disposed at an aperture stop of the objective lens assembly.

6. The system of claim 1, wherein the diaphragm is disposed at an entrance pupil of the objective lens assembly.

7. The system of claim 1, wherein the diaphragm is disposed at an exit pupil of the objective lens assembly.

8. The system of claim 1, wherein the second dimension of the aperture is about four times greater than the first dimension.

9. The system of claim 1, wherein a shape of the aperture is generally rectangular.

10. The system of claim 1, wherein a shape of the aperture is one of a geometric stadium, an oval, a rhombus, and a rounded-corner rectangle.

11. The system of claim 1, wherein the image sensor is one of:
- a charge-coupled device (CCD),
- a complementary metal-oxide-semiconductor (CMOS) device, and
- a N-type metal-oxide-semiconductor (NMOS) device.

12. The system of claim 1, wherein:
- a normal defined by the sample plane is skewed by a first angle ($\gamma$) relative to the optical axis; and
- a normal defined by the image sensor is skewed by a second angle ($\gamma'$) relative to the optical axis.

13. The system of claim 12, wherein the first angle ($\gamma$) and the second angle ($\gamma'$) are arranged in a Scheimpflug configuration, such that the second angle ($\gamma'$) is chosen relative to the first angle ($\gamma$) according to the relation:

$$\gamma' = \tan^{-1}\left[\frac{S_i}{S_o}\tan(\gamma)\right],$$

where $S_i$ is an image distance measured from the objective lens assembly to the image sensor and $S_o$ is an object distance measured from the sample plane to the objective lens assembly.

14. The system of claim 1, wherein the projection system comprises:
- at least one illumination source; and
- a projection optical assembly for projecting light from the illumination source onto the sample plane in the form of a line.

15. The system of claim 14, wherein:
- the at least one illumination source is a laser source; and
- the luminous line is a laser line projected onto the sample plane.

* * * * *